United States Patent
Vauchel et al.

(10) Patent No.: US 9,156,566 B2
(45) Date of Patent: Oct. 13, 2015

(54) SECURING PLATE AND LONGITUDINAL HANDLING MEMBER FOR A ONE-PIECE AIRCRAFT PROPULSION UNIT

(75) Inventors: Guy Bernard Vauchel, Le Havre (FR); Nicolas Hillereau, Le Havre (FR); Jerome Collier, Le Havre (FR); Jean-Francois Cribelier, Le Havre (FR)

(73) Assignee: AIRCELLE, Gonfreville L'Orcher (FR)

( * ) Notice: Subject to any disclaimer, the term of this patent is extended or adjusted under 35 U.S.C. 154(b) by 1228 days.

(21) Appl. No.: 12/666,122

(22) PCT Filed: Jun. 2, 2008

(86) PCT No.: PCT/FR2008/000740
§ 371 (c)(1),
(2), (4) Date: Dec. 22, 2009

(87) PCT Pub. No.: WO2009/007520
PCT Pub. Date: Jan. 15, 2009

(65) Prior Publication Data
US 2010/0181418 A1    Jul. 22, 2010

(30) Foreign Application Priority Data
Jun. 22, 2007 (FR) .................................... 07 04495

(51) Int. Cl.
*B64F 5/00* (2006.01)
*B64D 27/18* (2006.01)
*B64D 27/26* (2006.01)

(52) U.S. Cl.
CPC .............. *B64F 5/0036* (2013.01); *B64D 27/18* (2013.01); *B64D 27/26* (2013.01)

(58) Field of Classification Search
CPC ....... B64D 27/18; B64D 27/26; B64D 5/0036
USPC .......... 244/54, 55; 248/554–557; 60/796, 797
See application file for complete search history.

(56) References Cited

U.S. PATENT DOCUMENTS

| 3,666,211 | A | * | 5/1972 | Cathers et al. .................. 244/54 |
| 4,725,019 | A | * | 2/1988 | White .............................. 244/54 |
| 5,320,307 | A | * | 6/1994 | Spofford et al. ................ 244/54 |
| 5,474,258 | A | * | 12/1995 | Taylor et al. .................... 244/54 |
| 5,871,175 | A | * | 2/1999 | Demouzon et al. ............. 244/54 |

(Continued)

FOREIGN PATENT DOCUMENTS

| FR | 2878229 A1 | 5/2006 |
| FR | 2891251 A1 | 3/2007 |
| WO | 2006097484 A1 | 9/2006 |

OTHER PUBLICATIONS

International Search Report PCT/FR2008/000740; Dated Feb. 3, 2009.

*Primary Examiner* — Tien Dinh
*Assistant Examiner* — Steven Hawk
(74) *Attorney, Agent, or Firm* — Brinks Gilson & Lione

(57) ABSTRACT

The invention relates to a securing plate (1) for removably securing a one-piece propulsion unit (17) to a wing of an aircraft, characterised in that it includes first connection means (4, 5, 8, 13, 14) for securing the plate to the wing, second connection means (24) for securing the one-piece propulsion unit to the plate and third connection means (7) for securing a pair of longitudinal handling members (22) to the plate. The invention also relates to a specific longitudinal member and to an installation including a one-piece propulsion unit secured in the plate.

5 Claims, 4 Drawing Sheets

(56) References Cited

U.S. PATENT DOCUMENTS

| | | | |
|---|---|---|---|
| 5,871,176 A * | 2/1999 | Demouzon et al. | 244/54 |
| 5,871,177 A * | 2/1999 | Demouzon et al. | 244/54 |
| 6,126,110 A * | 10/2000 | Seaquist et al. | 244/54 |
| 6,347,765 B1 * | 2/2002 | Jule et al. | 244/54 |
| 7,438,262 B2 * | 10/2008 | Chamberlain | 244/54 |
| 7,445,179 B2 * | 11/2008 | Diochon et al. | 244/54 |
| 7,740,200 B2 * | 6/2010 | Diochon et al. | 244/54 |
| 7,963,479 B2 * | 6/2011 | Cazals | 244/54 |
| 8,205,825 B2 * | 6/2012 | Huggins et al. | 244/54 |
| 8,336,812 B2 * | 12/2012 | Beaufort et al. | 244/54 |
| 2006/0219841 A1 * | 10/2006 | Dron et al. | 244/54 |
| 2007/0069069 A1 * | 3/2007 | Diochon et al. | 244/54 |
| 2007/0205324 A1 * | 9/2007 | Diochon et al. | 244/54 |
| 2008/0067287 A1 * | 3/2008 | Guibert et al. | 244/54 |
| 2008/0169378 A1 * | 7/2008 | Beaufort et al. | 244/54 |
| 2009/0108127 A1 * | 4/2009 | Cazals | 244/54 |
| 2009/0139072 A1 * | 6/2009 | Buckus et al. | 29/281.4 |
| 2009/0236469 A1 * | 9/2009 | Suciu et al. | 244/54 |
| 2009/0309005 A1 * | 12/2009 | Foster et al. | 248/554 |
| 2010/0043450 A1 * | 2/2010 | Marche et al. | 60/797 |
| 2010/0108802 A1 * | 5/2010 | Marche et al. | 244/54 |
| 2013/0145770 A1 * | 6/2013 | Garric et al. | 60/772 |

* cited by examiner

SECURING PLATE AND LONGITUDINAL HANDLING MEMBER FOR A ONE-PIECE AIRCRAFT PROPULSION UNIT

TECHNICAL FIELD

The present invention relates in particular to a securing plate for removably securing a one-piece propulsion unit to a wing of an aircraft.

BACKGROUND

It has been known for a very long time to design a nacelle for an aircraft adapted to be mounted around an engine including a blower casing, said nacelle comprising a connecting structure adapted to be mounted on the downstream edge of said casing, on the one hand, and on a pylon, on the other hand, this pylon being fastened to a wing or part of the fuselage of the aircraft.

An engine change is effected by disconnecting the engine at the level of the suspension. Some cowls of the nacelle, known as the Transcowl and the Fan Cowl, remain connected to the pylon and must therefore be held open to enable replacement of the engine. A device for raising and lowering the engine is then used. This device comprises two independent longitudinal members disposed transversely relative to the axis of the engine, one being fixed to the front of the pylon and the other to the middle. A bootstrap type lifting system is provided at each end of the two longitudinal members so as to be able to adjust the height of the engine at four points, each lifting system being independent of the other three.

However, employing a one-piece propulsion unit instead of a standard assembly as referred to above has recently been envisaged. Accordingly, in such a one-piece propulsion unit, the engine, the nacelle and the pylon are inseparable and the usual interface disappears.

In such a configuration, the standard engine change maintenance procedure is rendered obsolete since the pylon is now fastened to the engine and the nacelle and thus can no longer support the two longitudinal members described above.

BRIEF SUMMARY

The disclosure provides a securing plate for removably securing a one-piece propulsion unit to a wing of an aircraft, characterized in that it includes first connection means for securing the plate to the wing, second connection means for securing the one-piece propulsion unit to the plate, and third connection means for securing a pair of longitudinal handling members to the plate.

Accordingly, after securing the longitudinal members and equipping each of them with a standard bootstrap system, it suffices to disconnect the one-piece propulsion unit from the plate attached to the wing to carry out the maintenance operation. This therefore enables the engine change to be carried out in a very short time as well as limiting the number of manual operations. The present invention therefore creates a new interface between the handling tooling on the ground and the parts remaining fixed to the wing.

In a preferred embodiment of the first connection means the latter means are produced in the form of attachment fixtures.

At least one first attachment fixture and one second attachment fixture facing each other are preferably provided on either side of the plate.

At least one front attachment fixture is preferably provided in the front part of the plate and/or at least one rear attachment fixture is provided in the rear part of the plate.

In a preferred embodiment of the second connection means the latter means are produced in the form of holes formed in the plate.

In a preferred embodiment of the third connection means the latter means are produced in the form of holes formed in the plate.

The present invention also relates to a longitudinal handling member intended to be fixed in a securing plate according to the invention, characterized in that it comprises first connection members adapted to cooperate with the first connection means of the plate and second connection members for connection to the wing.

The first connection members advantageously comprise a first junction fixture in the central part.

The second connection members advantageously comprise a second junction fixture in the rear part.

A longitudinal member according to the invention preferably comprises a front part adapted to receive a link disposed transversely and/or this longitudinal member can comprise a central part adapted to receive a link disposed transversely.

Finally, the invention also relates to a securing plate according to the invention fixed in a wing of an aircraft and a one-piece propulsion unit attached to said plate.

During maintenance operations this installation advantageously comprises two longitudinal members according to the invention disposed along the axis of the one-piece propulsion unit and connected to the plate.

BRIEF DESCRIPTION OF THE DRAWINGS

The invention will be better understood with the aid of the detailed description given hereinafter with reference to the appended drawings, in which.

DETAILED DESCRIPTION

Figure 1:
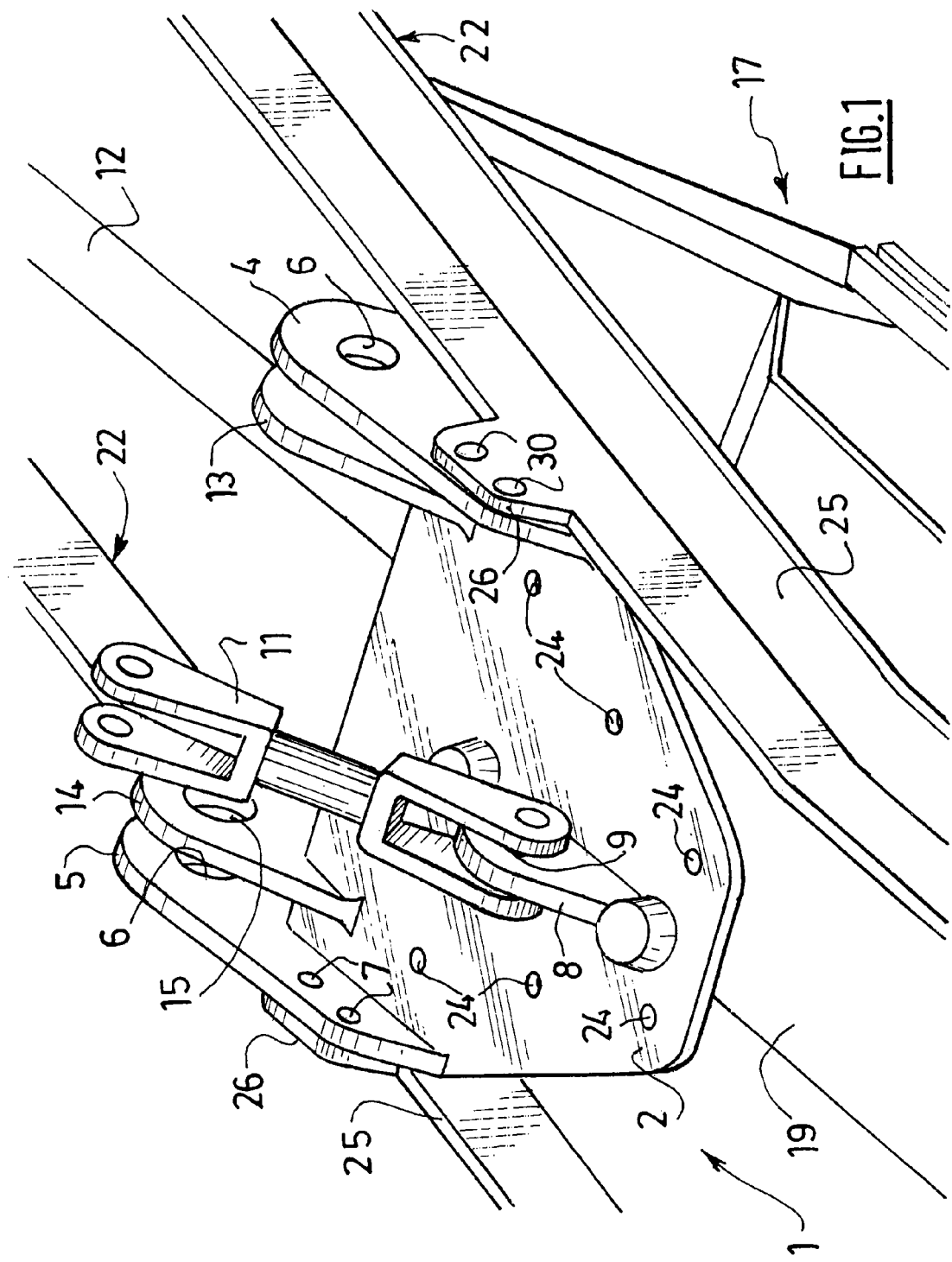
FIG. 1 is a perspective view of a securing plate of the invention.

A securing plate 1 of the invention, as more specifically represented in FIG. 1, comprises a substantially plane base 2 substantially forming an isosceles trapezium and intended to be fixed into a wing 3 of an aircraft.

This base 2 includes six holes 24 arranged in a V-shape. Also, this base 2 is between a first attachment fixture 4 and a second attachment fixture 5 facing each other and oriented outwardly in a plane perpendicular to said base 2. A rear orifice 6 and two front holes 7 are provided in each of the two attachment fixtures 4, 5.

The base 2 also includes a third attachment fixture 13 and a fourth attachment fixture 14 facing each other and oriented outward in a plane perpendicular to said base 2. These two attachment fixtures 13, 14 are each furnished with a hole 15 and are aligned with the first and second attachment fixtures 4, 5 so that the orifices 6 and the holes 15 are also aligned.

A front attachment fixture 8 furnished with an eyelet 9 is provided in the front part of the upper face of the base 2, on the axis of symmetry of the base 2, and so is not in alignment with the attachment fixtures 4, 5, 13 and 14.

Figure 4:
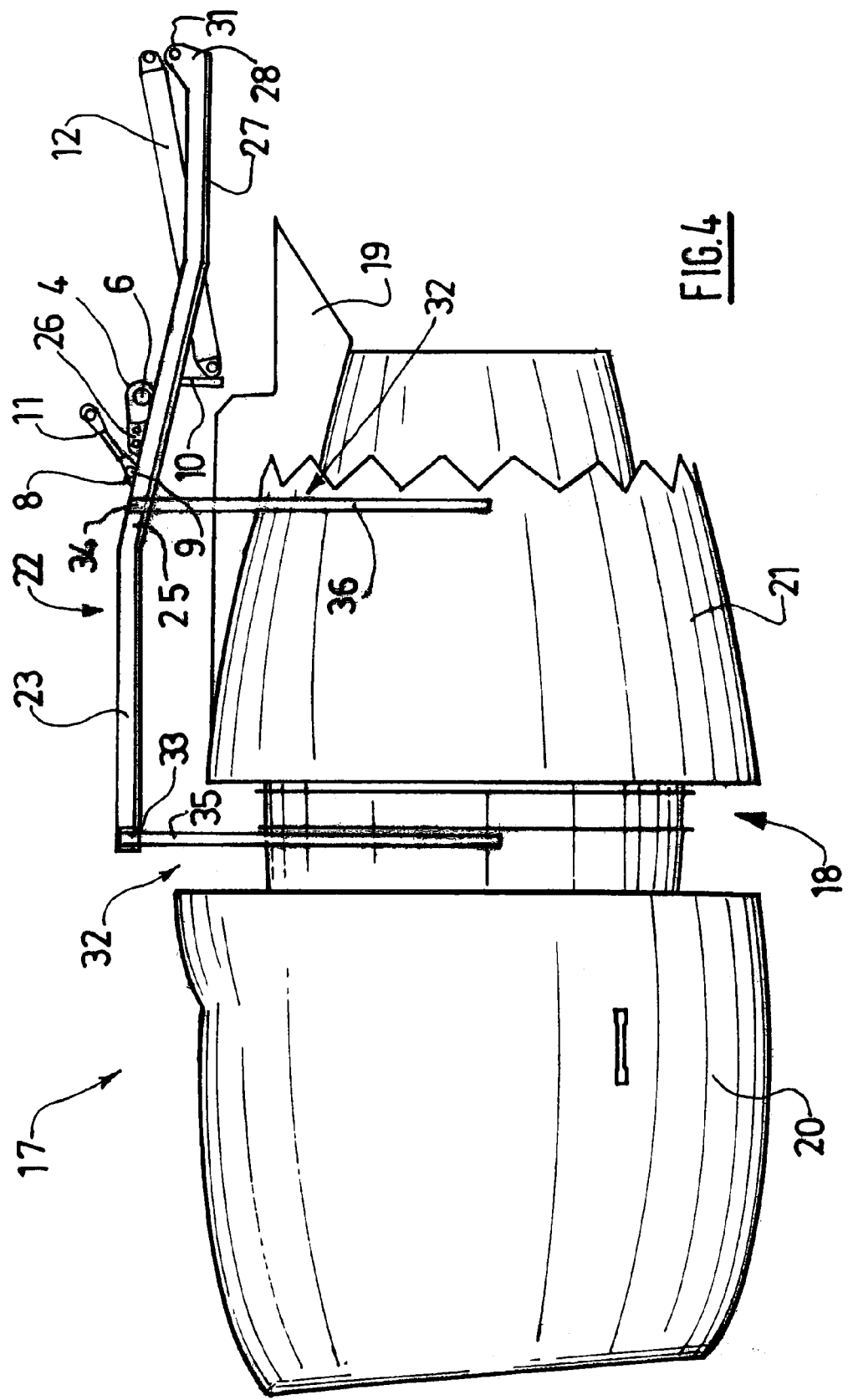
FIG. 4 is a side view of the installation represented in FIG. 3.

As more particularly represented in FIG. 4, the base 2 is extended at the rear by a rear attachment fixture 10 oriented inwardly in a plane perpendicular to said base 2. This rear attachment fixture 10 is equipped with an eyelet (not shown) disposed on the axis of symmetry of the base 2.

The plate 1 can therefore be fixedly attached to the wing 3 by means of its attachment fixtures 4, 5, 8, 10, 13 and 14.

To be more precise, each pair of attachment fixtures 4, 13 and 5, 14 can be bolted into a fixed lug (not shown) of the wing 3 to provide balanced retention. The eyelet 9 of the front attachment fixture 8 and the eyelet of the rear attachment fixture 10 are connected to a fixed point of the wing 3 by a respective link 11, 12.

To be more precise, the one-piece propulsion unit 17 is broadly divided into an engine (not shown), a nacelle 18 and a pylon 19 that cannot be separated from each other. Broadly speaking, the nacelle 18 comprises a front structure 20 around the casing and a rear structure 21 generally serving as a thrust reverser.

The one-piece propulsion unit 17 is fixedly attached in the base 2 by bolts in the holes 24.

To carry out maintenance operations during which the engine is in particular removed and then reinstalled, it is necessary to use two handling longitudinal members 22 as represented in FIGS. 1 to 4.

Each of these two longitudinal members 22 comprises a front part 23, a central part 25 that can be inclined and equipped with at least a first junction fixture 26, and a rear part 27 equipped with a second junction fixture 28, these first and second junction fixtures 26, 28 being disposed outwardly in a plane perpendicular to the base 2.

As can be deduced more particularly from FIG. 1, the first junction fixture 26 in this example is equipped with two holes 30 similar to the holes 7 of the attachment fixtures 4, 5, the distance between which is identical to that measured between the holes 7. Also, an eyelet 31 is produced in the second junction fixture 28.

The longitudinal members 22 are fitted in the following manner. Access to the various fixtures is obtained by demounting the external cowls from the pylon 19 or by opening a hatch for passing the tooling through and securing it. This access must be easy and fast so as not to increase the mounting/demounting times.

The longitudinal members 22 are then disposed on either side of the plate 1 so that, on the one hand, the first and second junction fixtures 26, 28 of the central part 25 can be bolted to the respective attachment fixtures 4, 5 by means of the complementary holes 7, 30 and, on the other hand, the eyelet 31 can be fixed by bolting in a fixed point (not shown) fastened to the wing 3.

Alternatively, each longitudinal member 22 can also rest on said fixtures if necessary.

Figure 2:
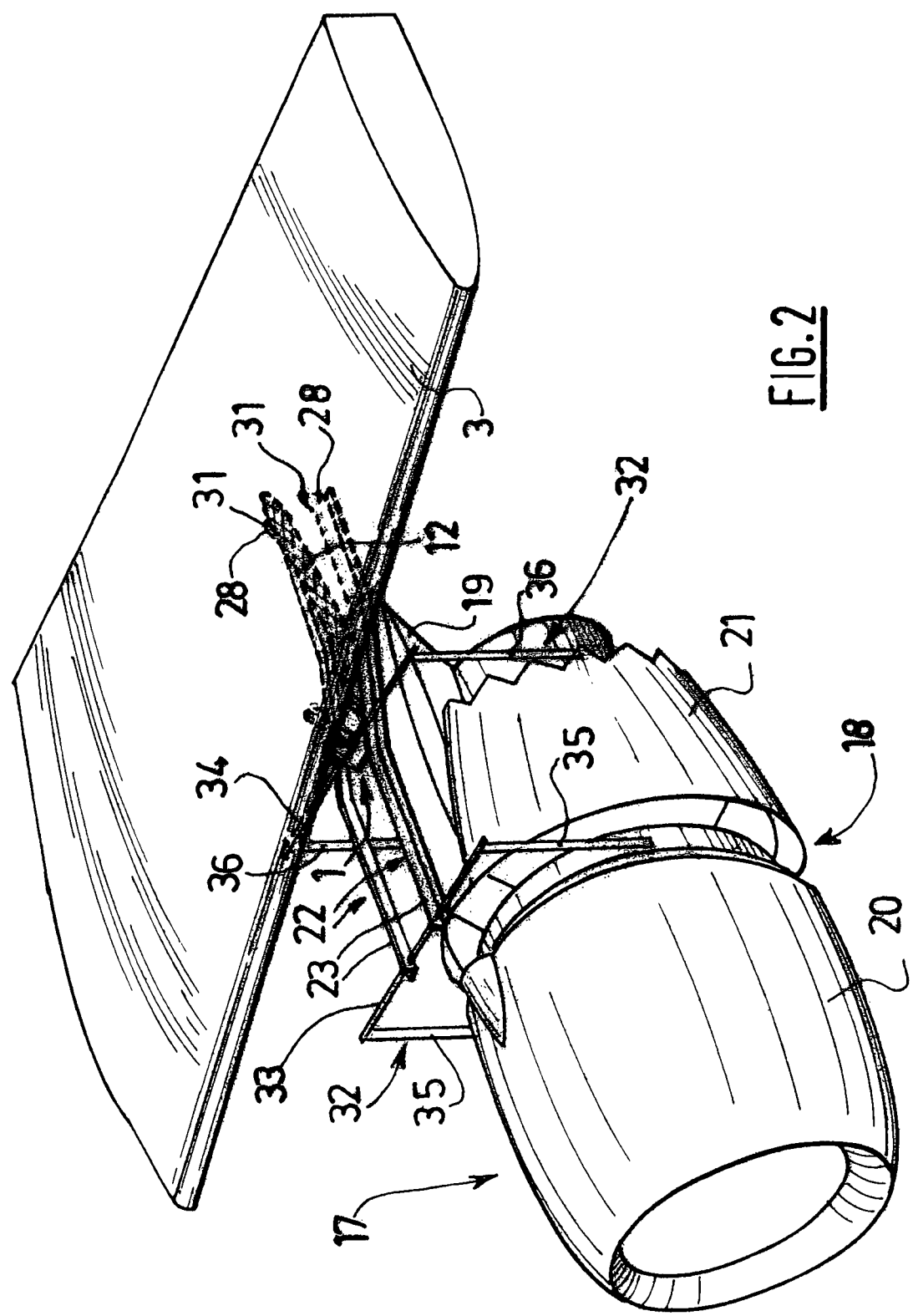
FIG. 2 is a diagrammatic perspective view of an installation of the invention during a maintenance operation.
Figure 3:
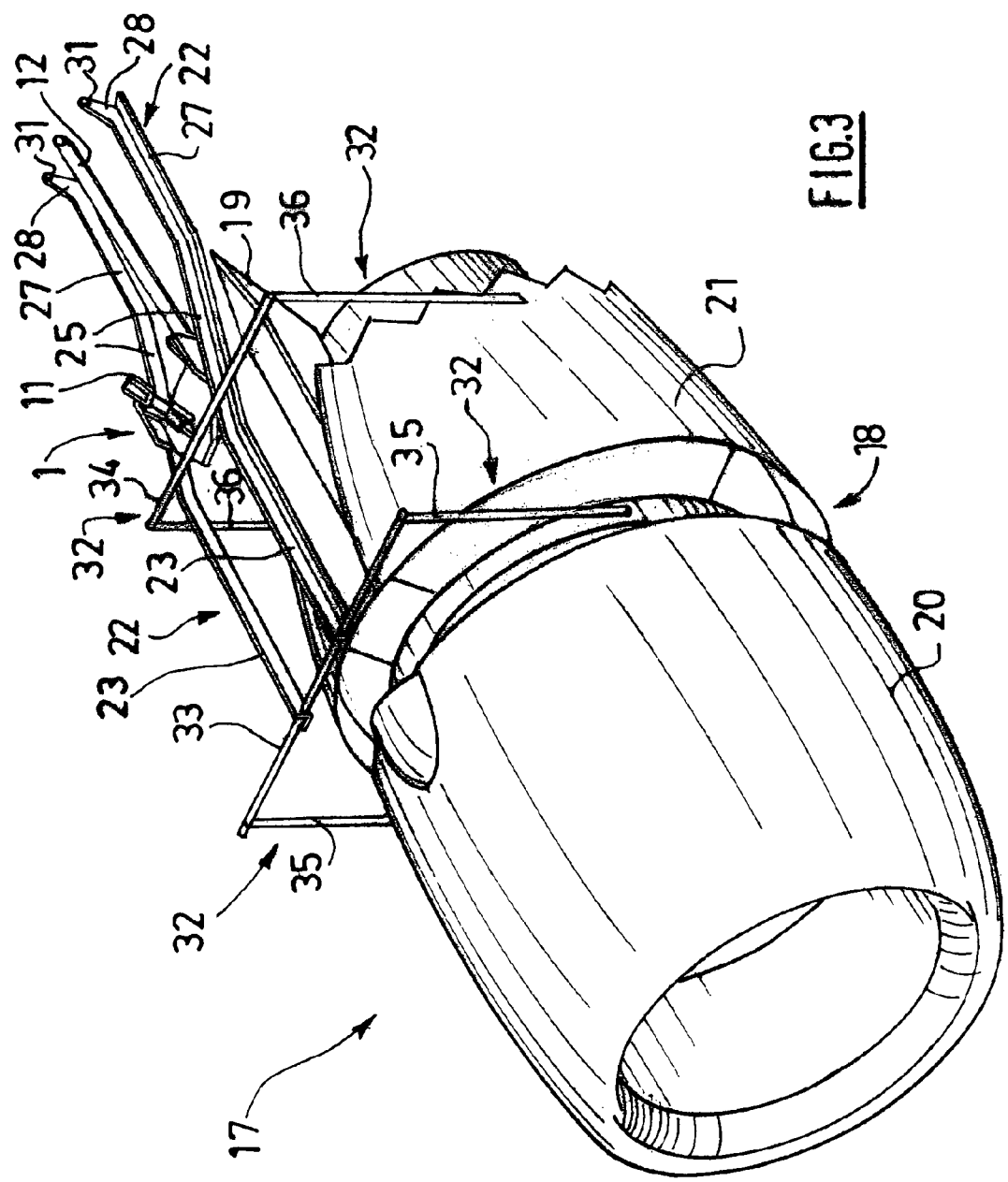
FIG. 3 is a view similar to FIG. 2 with the wing omitted.

The personnel can then proceed to the standard installation of the bootstrap type lifting systems 32. For this purpose, it is first necessary, as shown in FIGS. 2 to 4, to translate the forward structure 20 toward the front in order to provide access to hoisting points on the engine structure.

A first link 33 is fixed transversely in the front end of the front part 23 and a second link 34 is fixed transversely in the central part 25 near the front part 23. Obviously, these arrangements are such that the first link 33 and the second link 34 are respectively positioned in front of and behind the center of gravity of the engine.

Note that, the structure of the plate 1 can alternatively be used to secure and structurally reinforce the second link 34.

A strap 35 is connected to each of the two ends of the first link 33 and is fixed to a first attachment point (not specifically shown) of the engine.

A strap 36 is connected to each of the two ends of the second link 34 and is fixed to an attachment point (not specifically shown) of the rear structure 21.

Alternatively, the attachment point can be on the structure of the pylon 19.

Personnel can then release the one-piece propulsion unit 17 from the plate 1, which remains fixed in the wing 3, and then lower said one-piece propulsion assembly 17 in the traditional manner by means of each of the lifting systems 32, the latter systems enabling the height at four points to be adjusted, each lifting system 32 being independent of the other three.

Once maintenance operations have been carried out on the engine, it suffices for the personnel first of all to refit the one-piece propulsion unit 17 by means of the lifting systems 32, then to attach it to the plate 1, and finally to detach the two longitudinal members 22 from the plate 1 and the wing 3.

Alternatively, it is clearly equally possible to demount said front structure 20 instead of translating it. Another variant provides a fixed front structure 20 that and has anchor points (not shown) for the strap 35 and the link 33.

Thus these maintenance operations can be carried out very quickly and easily, as well as guaranteeing maximum safety for the personnel responsible for this work.

Although the invention has been described with reference to particular embodiments, it is clear that it is not limited to these and that it comprises all technical equivalents of the means described and combinations thereof that are within the scope of the invention.

The invention claimed is:

1. A one-piece propulsion unit comprising a securing plate for removably securing said one-piece propulsion unit to a wing of an aircraft, comprising: a connection means securing the plate to the wing, the connection means comprising a pair of attachment fixtures facing each other and oriented outwardly in a plane perpendicular to a base of the plate, and each attachment fixture defining a rear orifice to fixedly attach the securing plate to the wing, and front holes, the front holes being complementary to receive a pair of longitudinal handling members, wherein a central part of the longitudinal handling members is connected to the attachment fixtures by the front holes during maintenance of the propulsion unit being performed on the ground, and the front holes do not receive a structural load-carrying component during flight of the aircraft; and a connection means securing the plate to the propulsion unit.

2. The propulsion unit as claimed in claim 1, wherein the pair of the attachment fixtures comprise a first attachment fixture and a second attachment fixture facing each other.

3. The propulsion unit as claimed in claim 1, wherein at least one front attachment fixture is provided in the front part of the securing plate.

4. The propulsion unit as claimed in claim 1, wherein at least one rear attachment fixture is provided in a rear part of the securing plate.

5. A process for handling a one-piece propulsion unit according to claim 1, comprising:
   selecting the longitudinal handling members;
   fixing the longitudinal handling members to the securing plate and to the wing by cooperation of respective connection means of the longitudinal handling members with the securing plate and the wing;
   installing bootstraps between the longitudinal handling members and said one-piece propulsion unit; and
   releasing said one-piece propulsion unit from the securing plate.

* * * * *